(12) United States Patent
Chen

(10) Patent No.: US 8,430,506 B2
(45) Date of Patent: Apr. 30, 2013

(54) EYEGLASSES WITH SNAP-FITTED LENSES

(76) Inventor: Lin Yun Chen, Tainan (TW)

( * ) Notice: Subject to any disclaimer, the term of this patent is extended or adjusted under 35 U.S.C. 154(b) by 87 days.

(21) Appl. No.: 12/973,872

(22) Filed: Dec. 20, 2010

(65) Prior Publication Data

US 2011/0279771 A1    Nov. 17, 2011

(30) Foreign Application Priority Data

May 11, 2010    (TW) .............................. 99208767 U

(51) Int. Cl.
*G02C 1/04*    (2006.01)
(52) U.S. Cl.
USPC .......................................... 351/103; 351/106

(58) Field of Classification Search ................... 351/41, 351/44, 83, 86, 103–109, 111, 116, 119, 351/121, 153; 16/228
See application file for complete search history.

(56) References Cited

U.S. PATENT DOCUMENTS 6,863,395 B1 *    3/2005    Teng .............................. 351/103

* cited by examiner

*Primary Examiner* — Huy K Mai

(57) ABSTRACT

The present invention provides eyeglasses with snap-fitted lenses, in which a hook of a fastener is snap-fitted into a locking notch of a corresponding lens. Thus, the removal and insertion of the lenses can be easily carried out to facilitate the repair and exchange of the lenses.

4 Claims, 4 Drawing Sheets

EYEGLASSES WITH SNAP-FITTED LENSES

BACKGROUND OF THE INVENTION

1. Field of the Invention

The present invention relates to eyeglasses with snap-fitted lenses, and in particular to eyeglasses with snap-fitted lenses for easy removal and insertion of the lenses by a simple snap-fitting action.

2. Description of the Prior Art

In general, eyeglasses comprise an eyeglass frame. Both outer sides of the eyeglass frame are pivotally connected with two symmetrical ear stems. The eyeglass frame is provided with two sub-frames. The inner edge of the rim of each sub-frame is provided with an insertion slot for allowing a lens to be inserted therein. In order to hold the lens in the insertion slot, a wall inside the insertion slot facing a wearer's face and a wall outside the insertion slot away from the wearer's face are configured as an inner retaining piece and an outer retaining piece respectively. On the other hand, the wall inside the insertion slot and the wall outside the insertion slot undesirably form an obstacle to the assembly of the lens. Thus, it is necessary to exert a large force to press the lens into the insertion slot by means of the elasticity of the lens. However, the lens is somewhat brittle, and thus pressing the lens into the insertion slot by a large force or detaching the lens from the insertion slot may cause the lens to suffer damage.

SUMMARY OF THE INVENTION

In order to solve the above problems, an objective of the present invention is to provide eyeglasses with snap-fitted lenses for easy removal and insertion of the lenses by a simple snap-fitting action.

In order to achieve the above objective, the present invention is to provide eyeglasses with snap-fitted lenses, including:

an eyeglass frame having two fasteners pivotally connected to outer sides thereof, one end of each fastener being provided with a hook, the eyeglass frame having two symmetrical sub-frames, each of the two sub-frames being provided with at least one inner retaining piece, each of the sub-frames being provided with an insertion slot adjacent to a central portion of the eyeglass frame, both outer sides of the eyeglass frame being pivotally connected with an ear stem respectively; and two symmetrical lenses each operatively abutting against the inner retaining piece and inserted into the insertion slot, a front surface of each lens being provided with a locking notch;

wherein the hook of each fastener is snap-fitted into the locking notch of the adjacent lens by using a pivoting portion between the fastener and the eyeglass frame as a pivot, and the fastener is configured as an outer retaining piece for the lens.

According to the present invention, the hook of the fastener is easily snap-fitted into the locking notch of the adjacent lens, and the fastener is configured as an outer retaining piece for the lens. Further, the lens can be easily removed from the insertion slot by releasing the hook from the locking notch. Therefore, with this structure, the repair, removal and insertion of the lenses is carried out easily. Furthermore, a variety of lenses can be mounted to the eyeglasses of the present invention in an exchangeable manner.

DETAILED DESCRIPTION OF THE INVENTION

In order to better understand the present invention, a detailed description relating to a preferred embodiment of the present invention will be made with reference to the accompanying drawings.

Figure 1:
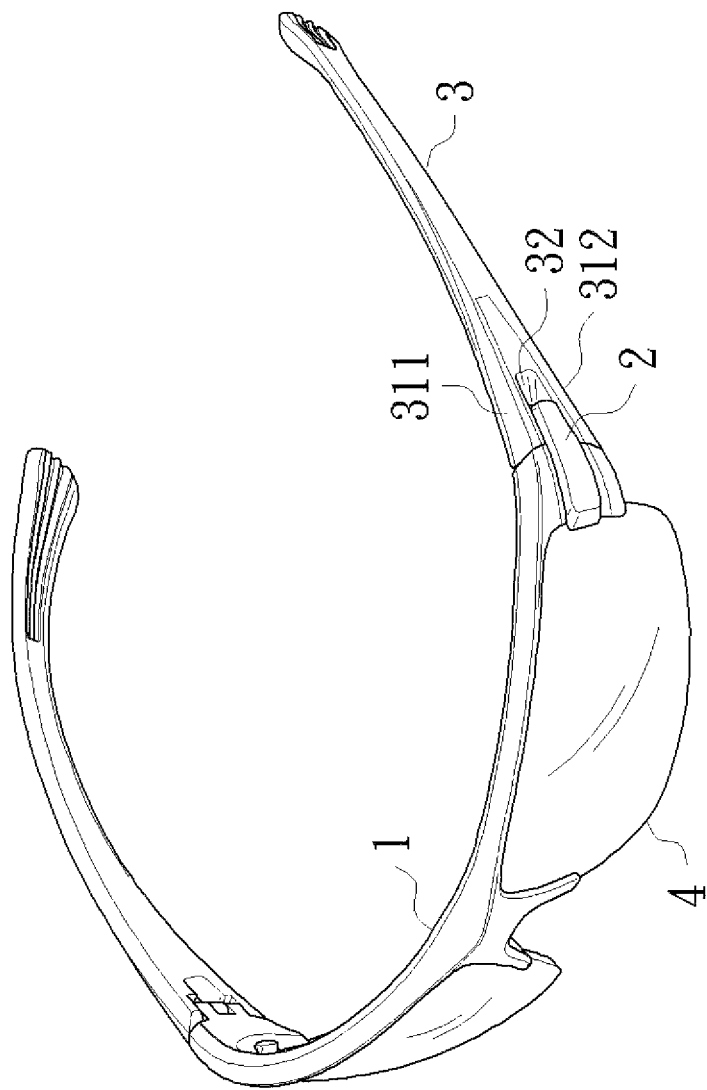
FIG. 1 is a perspective view of an embodiment of the present invention.
Figure 2:
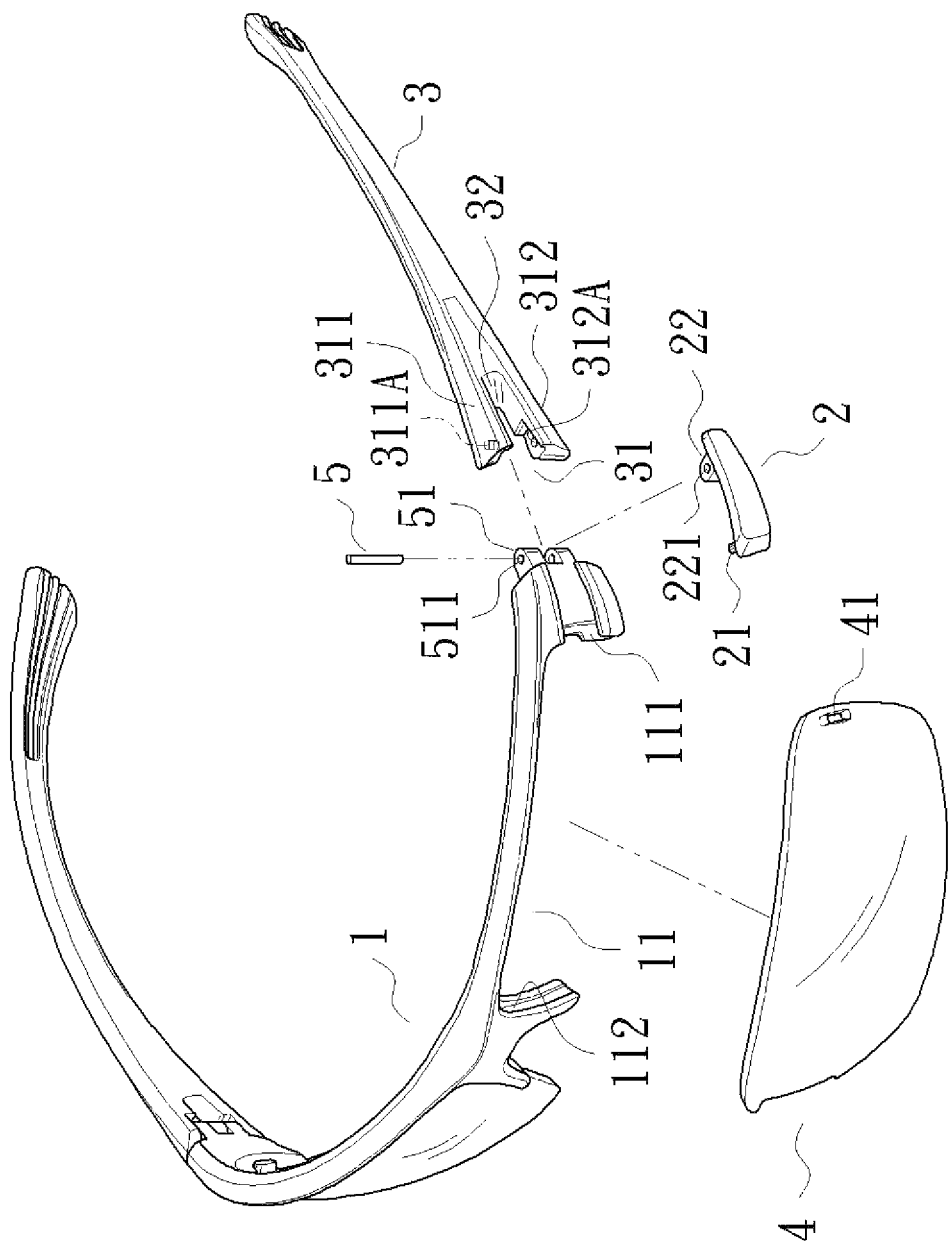
FIG. 2 is an exploded perspective view of an embodiment of the present invention.

Please refer to FIGS. 1 and 2. Embodiments of the present invention provide eyeglasses with snap-fitted lenses, including an eyeglass frame 1 and two symmetrical lenses 4.

Both outer sides of the eyeglass frame 1 are pivotally provided with a respective fastener 2. One end of each fastener 2 is provided with a hook 21. The eyeglass frame 1 has two symmetrical sub-frames 11. Each of the two sub-frames 11 is provided with at least one inner retaining piece 111 facing a wearer's face. Both outer sides of the eyeglass frame 1 are pivotally connected with an ear stem 3 respectively. Each of the sub-frames 11 is provided with an insertion slot 112 adjacent to a central portion of the eyeglass frame 1.

Each of the two symmetrical lenses 4 operatively abuts against the inner retaining piece 111 and is inserted into the insertion slot 112. The insertion slot 112 may be defined by an inner retaining piece 111. A front surface of each lens 4 is provided with a locking notch 41.

Figure 3:
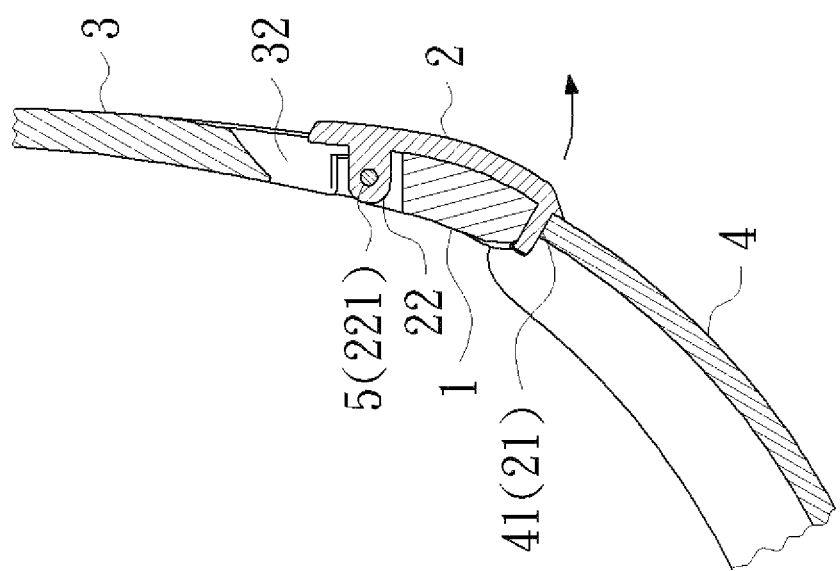
FIG. 3 is a schematic view of an embodiment of the present invention showing a hook of a fastener being snap-fitted into a locking notch of a lens.

Please refer to FIGS. 2 and 3. With the above arrangement, the hook 21 of each fastener 2 is snap-fitted into the locking notch 41 of the adjacent lens 4 by using a pivoting portion between the fastener 2 and the eyeglass frame 1 as a pivot, and the fastener 2 is configured as an outer retaining piece for the lens 4. In this way, when inserted into the insertion slot 112, the lens 4 is sandwich between the inner retaining piece 111 and the fastener 2 serving as the outer retaining piece, thereby preventing against easy detachment of the lens 4 from the insertion slot 112.

In practice, a distance between the fastener 2 and the pivot may be slightly smaller than a distance between the locking notch 41 and the pivot, so that the hook 21 of the fastener 2 can be snap-fitted into the locking notch 41 in a tightly fitting manner by means of the elasticity of the fastener 2.

Both the temple 3 and the fastener 2 are pivotally connected to one outer side of the eyeglass frame 1 at the same position in which a pivoting pin 5 is provided. Both outer sides of the eyeglass frame 1 are provided with a lug 51 respectively. Each of the lugs 51 is provided with at least one through-hole 511. In FIG. 2, two through-holes 511 are shown. Each of the fasteners 2 is also provided with a lug 22. Each of the lugs 22 is provided with at least one through-hole 221. The pivoting pin 5 is disposed through the through-holes 511 and the through-holes 221.

One end of each ear stem 3 is formed with a forked section 31 having an upper piece 311 and a lower piece 312. The upper piece 311 is provided with an insertion hole 311A, and the lower piece 312 is provided with an insertion hole 312A. The pivoting pin 5 is also disposed through the insertion hole 311A and the insertion hole 312A.

Figure 4:
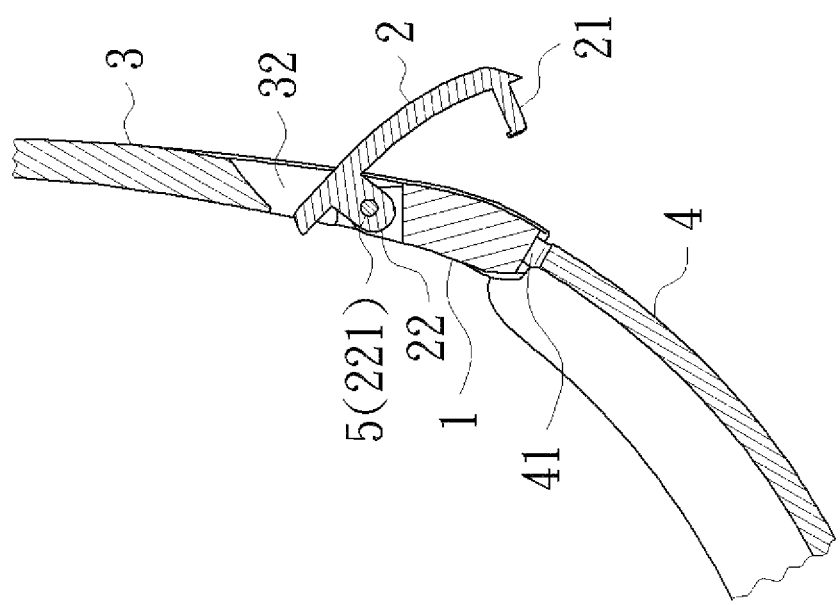
FIG. 4 is a schematic view of an embodiment of the present invention showing that a hook of a fastener being removed from the locking notch of the lens.

Please refer to FIG. 4. Each ear stem 3 is positioned to adjoin the corresponding fastener 2. Each ear stem 3 is formed with an accommodating notch 32 to provide a space for allowing the pivotal rotation of the corresponding fastener 2.

According to the present invention, the hook 21 of the fastener 2 is simply snap-fitted into the locking notch 41 of the adjacent lens 4, and the fastener 2 is configured as an outer retaining piece for the lens 4. Further, the lens 4 can be easily removed from the insertion slot 112 by releasing the hook 21 from the locking notch 41. Therefore, with this structure, the repair, removal and insertion of the lenses 4 is carried out easily. Furthermore, a variety of lenses can be mounted to the eyeglasses of the present invention in an exchangeable manner.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. Eyeglasses with snap-fitted lenses, including:
    an eyeglass frame having at least two fasteners pivotally connected to outer sides thereof, one end of each fastener being provided with a hook, the eyeglass frame having two symmetrical sub-frames, each of the two sub-frames being provided with at least one inner retaining piece, each of the sub-frames being provided with an insertion slot adjacent to a central portion of the eyeglass frame, both outer sides of the eyeglass frame being pivotally connected to a respective ear stem; and
    two symmetrical lenses each operatively abutting against the inner retaining piece and inserted into the insertion slot, a front surface of each lens being provided with a locking notch;
    wherein the hook of each fastener is snap-fitted into the locking notch of the adjacent lens by using a pivoting portion between the fastener and the eyeglass frame as a pivot, the fastener is configured as an outer retaining piece for the lens, and each ear stem and corresponding fastener are pivotally connected to the eyeglass frame at a same position.

2. The eyeglasses with snap-fitted lenses according to claim 1, further including two pivoting pins corresponding to respective pivoting portions, the outer sides of the eyeglass frame being provided with a respective lug, each of the lugs being provided with at least one through-hole, each of the fasteners being provided with a lug, the lug of each fastener being provided with at least one through-hole, the respective pivoting pin being disposed through the through-holes of the corresponding lug of the eyeglass frame and the corresponding through-holes of the lug of the fastener, each ear stem being formed with a forked section having an upper piece and a lower piece, the upper piece and the lower piece being provided with a respective insertion hole for allowing the corresponding pivoting pin to be inserted therein.

3. The eyeglasses with snap-fitted lenses according to claim 1, wherein each ear stem is positioned to adjoin the corresponding fastener, each of the ear stems being provided with an accommodating notch to provide a space for allowing a pivotal rotation of each corresponding fastener.

4. The eyeglasses with snap-fitted lenses according to claim 1, wherein a distance between each fastener and a corresponding pivoting pin is smaller than a distance between the locking notch and the pivoting pin so that the hook is snap-fitted into the locking notch by means of the elasticity of the fastener.

\* \* \* \* \*